(12) United States Patent
Ross

(10) Patent No.: US 7,774,824 B2
(45) Date of Patent: Aug. 10, 2010

(54) MULTIFACTOR DEVICE AUTHENTICATION

(75) Inventor: Alan D. Ross, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 952 days.

(21) Appl. No.: 10/865,367

(22) Filed: Jun. 9, 2004

(65) Prior Publication Data
US 2005/0278775 A1 Dec. 15, 2005

(51) Int. Cl.
*H04L 9/00* (2006.01)
(52) U.S. Cl. .............. 726/2; 726/10; 713/155; 705/73; 707/10; 709/229
(58) Field of Classification Search ............... 726/10
See application file for complete search history.

(56) References Cited

U.S. PATENT DOCUMENTS

| | | | |
|---|---|---|---|
| 5,848,233 A | | 12/1998 | Radia et al. |
| 5,968,176 A | | 10/1999 | Nessett et al. |
| 6,321,338 B1 | | 11/2001 | Porras |
| 6,873,988 B2 | * | 3/2005 | Herrmann et al. ............. 707/10 |
| 2002/0138643 A1 | | 9/2002 | Shin et al. |
| 2003/0065942 A1 | * | 4/2003 | Lineman et al. ............. 713/201 |
| 2003/0115154 A1 | * | 6/2003 | Anderson et al. ............. 705/73 |
| 2003/0167405 A1 | | 9/2003 | Freund et al. |
| 2004/0039924 A1 | | 2/2004 | Baldwin et al. |
| 2004/0103310 A1 | * | 5/2004 | Sobel et al. ................. 713/201 |
| 2004/0103317 A1 | * | 5/2004 | Burns ......................... 713/201 |
| 2004/0107360 A1 | * | 6/2004 | Herrmann et al. ............. 713/201 |
| 2004/0167984 A1 | * | 8/2004 | Herrmann ..................... 709/229 |
| 2004/0221176 A1 | * | 11/2004 | Cole ........................... 713/201 |
| 2004/0230835 A1 | * | 11/2004 | Goldfeder et al. ............. 713/201 |
| 2004/0250107 A1 | * | 12/2004 | Guo ............................ 713/200 |
| 2005/0021978 A1 | | 1/2005 | Bhat et al. |
| 2005/0210253 A1 | * | 9/2005 | Shigeeda ..................... 713/171 |
| 2005/0229246 A1 | | 10/2005 | Parmar et al. |
| 2005/0246768 A1 | | 11/2005 | Hunt et al. |
| 2007/0083750 A1 | * | 4/2007 | Miura et al. ................. 713/155 |
| 2007/0195779 A1 | | 8/2007 | Judge et al. |

OTHER PUBLICATIONS

Pending U.S. Appl. No. 10/865,364, filed Jun. 9, 2004 (inventor Alan D. Ross); Non-final Office Action dated Jan. 2, 2008.
Notice of Allowance for U.S. Appl. No. 10/865,364 mailed Dec. 16, 2008.
Cisco NAC The Development of the Self-Defending Network; White Paper, Jun. 2004, 5 pages.

* cited by examiner

*Primary Examiner*—Kambiz Zand
*Assistant Examiner*—Yonas Bayou
(74) *Attorney, Agent, or Firm*—Blakely, Sokoloff, Taylor & Zafman LLP

(57) ABSTRACT

Method and apparatus for device authentication with multiple factors. In one embodiment a combination of attributes and/or identifying values known by the device and the authenticator are presented for authentication. The combination of attributes may be presented together, or separately. Invalidity of one of the combination of attributes may result in a more restricted than may be granted for validity of all factors of the authentication.

21 Claims, 4 Drawing Sheets

MULTIFACTOR DEVICE AUTHENTICATION

RELATED APPLICATIONS

This Application is related to U.S. patent application Ser. No. 10/865,364, entitled "Integration of Policy Compliance Enforcement and Device Authentication," having common Inventorship, and filed concurrently herewith.

FIELD

Embodiments of the invention relate to authentication, and particularly to a method and apparatus for multifactor device authentication.

BACKGROUND

As more electronic system have become networked, there has been an increased focus on issues relating to security of networks, and restricting network access for security reasons. Device authentication is one tool that is used for network security purposes. Authentication is used, for example, in the Institute of Electrical & Electronics Engineers (IEEE) 802.1x standards. Traditionally, the concept of device authentication is based on storing and presenting device "credentials" to obtain access to a network. Obtaining access to a network may include receiving an Internet protocol (IP) address, receiving an access channel assignment, etc. Credentials have typically been based on an account/password combination, or are based on a digital authentication certificate, such as with the International Telecommunication Union (ITU) X.509 standard Recommendation.

One problem with the account/password combination and the digital certificate methods of authentication is the fact that credentials based on these mechanisms are generally portable. The credentials are portable because they could be presented from a device or system that is not the true "owner" of the credentials, yet may be authenticated as valid, thus giving access to the presenting device. For example, the known good credentials of a system could be transported to a rogue system that would be able to use the credentials to authenticate itself. Thus, from an authentication perspective, there is nothing to prevent theft or other falsification of the credentials, because standard device authentication only evaluates the validity of the credentials being presented, without being able to determine whether the presenter should be permitted to use the credentials.

BRIEF DESCRIPTION OF THE DRAWINGS

The description of embodiments of the invention includes various illustrations by way of example, and not by way of limitation in the figures and accompanying drawings.

DETAILED DESCRIPTION

Multifactor authentication includes authentication based on combinations of attributes used to increase attestation for the presenter. For example, attributes may include something the presenter has, something the presenter knows, something the presenter is, etc. A combination of attributes may provide for better attestation than a single attribute. Thus, something the presenter has may be combined with something the presenter knows. In the human realm, a person may have an identification card, an access card, etc., a person may know a personal identification number (PIN), a password, etc., and a person's physical attributes may be checked, such a fingerprint, a retina scan, etc. In the realm of electronic devices, something the device has may include a digital certificate, a cryptographic key, a secured value, etc., something the device knows may include a digital segment representing a passphrase and/or a PIN, a value to unlock a private key, etc., and something the device is may include a radio frequency identification (RFID), a hardcoded (e.g., fixed in hardware, programmed in read-only memory (ROM)) value, etc. Rather than relying on a single device attribute, as is traditionally done, multiple attributes could be combined to provide authentication.

Figure 1:
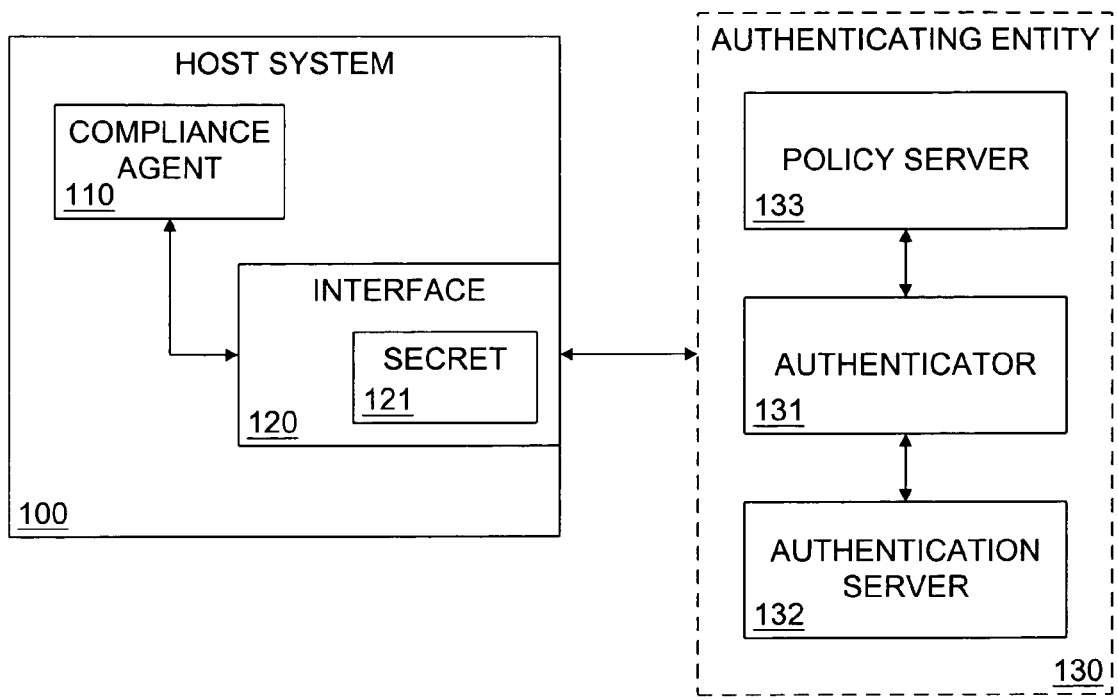
FIG. 1 is a block diagram of a system with multifactor authentication components in accordance with one embodiment of the invention.

FIG. 1 is a block diagram of a system with multifactor authentication components in accordance with one embodiment of the invention. Host system 100 represents a variety of electronic systems or devices. For example, host system 100 may include a personal computer (desktop, laptop, palmtop), a server, a handheld computing device, personal digital assistant (PDA), wireless computing device, cellular phone, game console, set-top box, etc. In one embodiment host system 100 includes interface 120 to interact with a device external to system 100. Interface 120 may include a network interface card, a network interface port, a wireless or wireline communication transceiver, infrared communication, etc.

In one embodiment interface 120 includes secret 121, which represents an authentication attribute. Secret 121 is presented by interface 120 to obtain external access for system 100 to external devices and/or entities. In one embodiment secret 121 represents a password-based bit sequence. In traditional authentication, interface 120 may present secret 121 to authenticator 130, which verifies the validity of the password-based bit sequence, and allows access to system 100 if the password-based bit sequence is determined to be valid. For example, authenticator 130 may have a database of valid user identification (ID)/password combination. If secret 121 represented a valid user ID/password combination that was found in the database, system 100 would merely present secret 121 and traditionally would receive access from authenticator 130. In one embodiment secret 121 is part of another agent (not shown) in system 100. Alternatively, secret 121 represents data residing in a storage device that is accessible and/or modifiable by compliance agent 110 and/or another agent of system 100. Thus, compliance agent 110 or another agent may access and/or perform operations with secret 121.

In one embodiment system 100 includes compliance agent 110, which represents a software, firmware, and/or hardware module configured to or capable of performing various functions. Compliance agent 110 may be used to add another layer of attestation to authentication. Thus, secret 121 may provide an authentication/attestation attribute, and compliance agent 110 could provide another authentication/attestation attribute. Compliance agent 110 may operate to present both secret 121 and another authentication/attestation attribute, whether concurrently or separately. Alternatively, another agent/element of system 100 may present secret 121 and compliance agent presents an additional authentication/attestation attribute.

Authenticator 131 may be in communication with authentication server 132, which represents a device that makes determinations as to which authentication credentials will be accepted. Thus, authentication server 132 provides a determination as to whether the credentials presented are valid, correct, and/or sufficient to provide host system 100 access to external devices, for example, over a network. In one embodiment authentication server 132 represents a separate physical device from authenticator 131. Authentication server 132 may exist as a combination of logic and/or executable instructions in a device physically separate from authenticator 131. Authentication server 132 may also exist as software executed on a device physically separate from authenticator 131.

In another embodiment authentication server 132 is part of authenticator 130, for example, as software and/or logic on authenticator 131. Authentication server 132 may be software on authenticator 130 that complies with the Remote Authentication Dial-In User Service (RADIUS) standard (the de facto industry standard created by Lucent), proposed as a standard by the Internet Engineering Task Force (IETF). Authentication server 132 may also be a software server on authenticator 131 that complies with the Diameter standard proposed in IETF request for comments (RFC) #3588. Authentication server 132 may be considered a policy determination point (PDP) that manages authentication determinations. This may include managing a database of known or valid attributes, checking attributes presented to authenticator 131, etc. Authenticator 131 could thus be considered a policy enforcement point (PEP) that acts on authentication policies to enforce them.

Policy server 133 may represent a device/module/software that provides policies relating to authentication. Policy server 133 may exist as separate from authenticator 131 and/or authentication server 132, or exist as part of one or both of authenticator 131 and authentication server 132. In one embodiment policy server 133 provides compliance policies with which system 100 should comply to be granted access to external systems. A compliance policy represents a broad range of rules for system 100 to follow to be fully authenticated by authenticator 131. These may include system 100 having a compliance agent running, not having guest or non-authenticated applications running, having antivirus software running, having a recently-updated antivirus scheme, having a security agent running, having operating system (OS) updates installed, etc. A remediation determination, or less network authorization, may be granted to a device that has less than complete compliance.

In one embodiment system 100 includes compliance agent 110, which represents a subsystem, a module, a function, etc., that verifies compliance of system 100 with compliance policies requested by authenticating entity 130. Compliance agent 110 may have access to various subsystems of host system 100 to verify compliance of system 100 with policies established by authenticating entity 130. For example, compliance agent 110 may access the host OS, a Microsoft Windows® registry, etc. Compliance agent 110, either directly or through interface 120, presents the compliance verification. Presenting the compliance verification may be performed in conjunction with presenting of other device credentials, such as secret 121, in response to a request for compliance, at a specified interval, at a particular point of execution and/or boot-up of system 100, etc.

Figure 2:
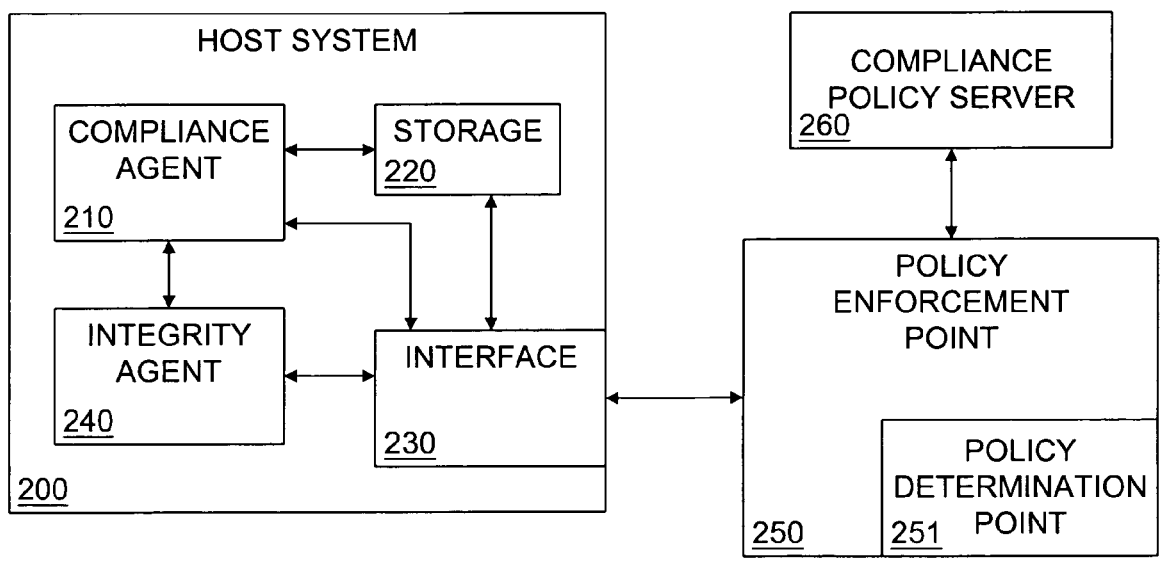
FIG. 2 is a block diagram of a system with multifactor authentication components and a host integrity agent in accordance with one embodiment of the invention.

FIG. 2 is a block diagram of a system with multifactor authentication components and a host integrity agent in accordance with one embodiment of the invention. Host system 200 represents an electronic system/device that may engage in communication over a network link. Host system includes interface 230 to interface system 200 with a network. A network includes a wireless or wired interconnection of devices. Interface 230 may provide network connectivity for host system 200. In one embodiment interface 230 includes a dedicated connection for an element of system 200. For example, compliance agent 210 and/or integrity agent 240 may have private network interconnections. These interconnections may be independent from interface 230, or may be specially allocated resources managed by interface 230. These connections are transparent to host system 200 in one embodiment.

Compliance agent 210 represents a module, e.g., a sequence of software/firmware instructions, a hardware circuit, an group of interconnected logic, etc., that determines observance of system 200 to a policy/rule associated with obtaining a network connection. The policy/rule may include identity of applications running on host system 200 (e.g., registered applications, non-guest applications, spyware applications, etc.), the use of security software (e.g., antivirus software, firewall software, etc.), hardware/software settings, etc. Compliance agent 210 may be configured and/or caused to execute at boot-up, loading up of a host OS, and/or execute during OS runtime. In one embodiment an Intel® Extensible Firmware Interface (EFI) pre-OS mode of platform operation may include execution of routines of compliance agent 210 and/or compliance agent 210 may be enabled to execute as part of the EFI mode.

A complete compliance scan includes scanning a host operating system (OS) on system 200. Thus, in one embodiment compliance agent 210 performs a scan after a host OS is operational. In another embodiment compliance agent 210 performs a scan prior to loading of a host OS, and updates scan results after or concurrently with loading of the OS and possibly applications to be executed on the OS. Compliance agent 210 may establish a connection with interface 230 prior to or after interface 230 requests a connection and presents credentials. In one embodiment compliance agent 210 is responsive to interface 230, and may perform a scan of host system 200 at the request of interface 230. Alternatively compliance agent 210 performs a scan and reports a level of compliance to interface 230 without a request from interface 230. Compliance agent 210 may also perform a scan and store the results for use by interface 230 at a later time.

System 200 may include storage 220, which represents a broad range of storage media, e.g., random access memory (RAM), flash, disk storage, hard drive, a Trusted Platform Module (TPM), etc. In one embodiment storage 220 stores credentials for authentication. The credentials may include device attributes (e.g., a password, a device identifier, etc.). The credentials may also include results of a compliance scan by compliance agent 210. For example, compliance agent 210 may perform a compliance scan and store a value or vector indicating a level of compliance of system 200. Compliance agent 210 may store date, time, version of the scan used, a policy for which the scan was performed, etc., in addition to, or separately from, a scan report and/or result. Thus, a compliance report and/or a compliance scan result may include information such as time of scan, the policy used to scan, an identity of the scanner, etc.

Thus, compliance agent 210 may perform a compliance scan and indicate the result to a temporary or persistent storage (not shown) of interface 230, and alternatively, or in addition, cause the result to be stored in storage 220. In such a case, storage 220 may include a "last known good" state or a last known good scan. This could be accessed by or sent to interface 230 for presenting for authentication. Also, it could be used to reestablish a lost link of system 200 without having to perform a new scan. An access enforcement entity/server could determine from the report if a stored scan is sufficiently current to allow access, or for example, request an updated scan.

In one embodiment compliance agent 210 includes a private network connection over which to transmit compliance scan results to an authenticating entity. A connection may be private because it is limited to access by particular elements of system 200 and/or because it is not visible to a host OS. A connection may not be visible to a host OS if the host OS has no knowledge of and/or no access to the connection. A private connection does not necessarily require a private physical interface, although a private connection may include a private physical interface. A private connection may occur over a private bus/interconnection between interface 230 and compliance agent 210, and a dedicated link on interface 230 to one or more devices external to system 200.

System 200 may be connected through interface 230 to policy enforcement point (PEP) 250. PEP 250 enforces an access determination made based at least in part on an access policy. Policy determination point (PDP) 251 may be included as a hardware/software module of PEP 250, or PDP 251 may be a standalone element, e.g., connected to PEP 250 over a digital communication medium. PDP 251 provides an access policy to control access to a link by systems such as host system 200. In one embodiment PDP 251 maintains a database of valid system credentials, which can be used to authenticate a system seeking access. PDP 251 may generate the policy, have the policy loaded into it, receive the policy from a remote entity (not shown), have remote access to a directory, etc.

Access may be granted or denied based at least in part on whether the credentials presented by host system 200 are authenticated. For example, assume that system 200 desires network access. Interface 230 may obtain a user name and password from storage 220 and present them to PEP 250 for authentication. PEP 250 may send the user name and password to PDP 251 to determine if the user name and password make up an attribute known by or considered valid to PDP 251. If PDP 251 acknowledges a valid attribute, PEP 250 may request a compliance scan of system 200, or alternatively grant access to system 200. If the attribute is considered invalid, a remediation access may be provided. A remediation access may include limited access, denied access to certain network points, limits on amount of access or amount of traffic, etc.

In one embodiment PDP 251 is in communication with compliance policy server (CPS) 260. CPS 260 may operate in conjunction with PDP 251 to provide policies for PEP 250 to enforce. CPS 260 may be part of PDP 251, or a separate module within PEP 250, or separate from both PEP 250 and PDP 251. CPS 260 provides policies/rules relating to compliance of host system 200. For example, assuming CPS 260 may provide that full access only be provided if system 200 has a highest level of compliance to a policy. A tiered level of access may be provided to system 200 for lower levels of compliance. In one embodiment any access less than full access may be considered a remediation access.

Figure 3:
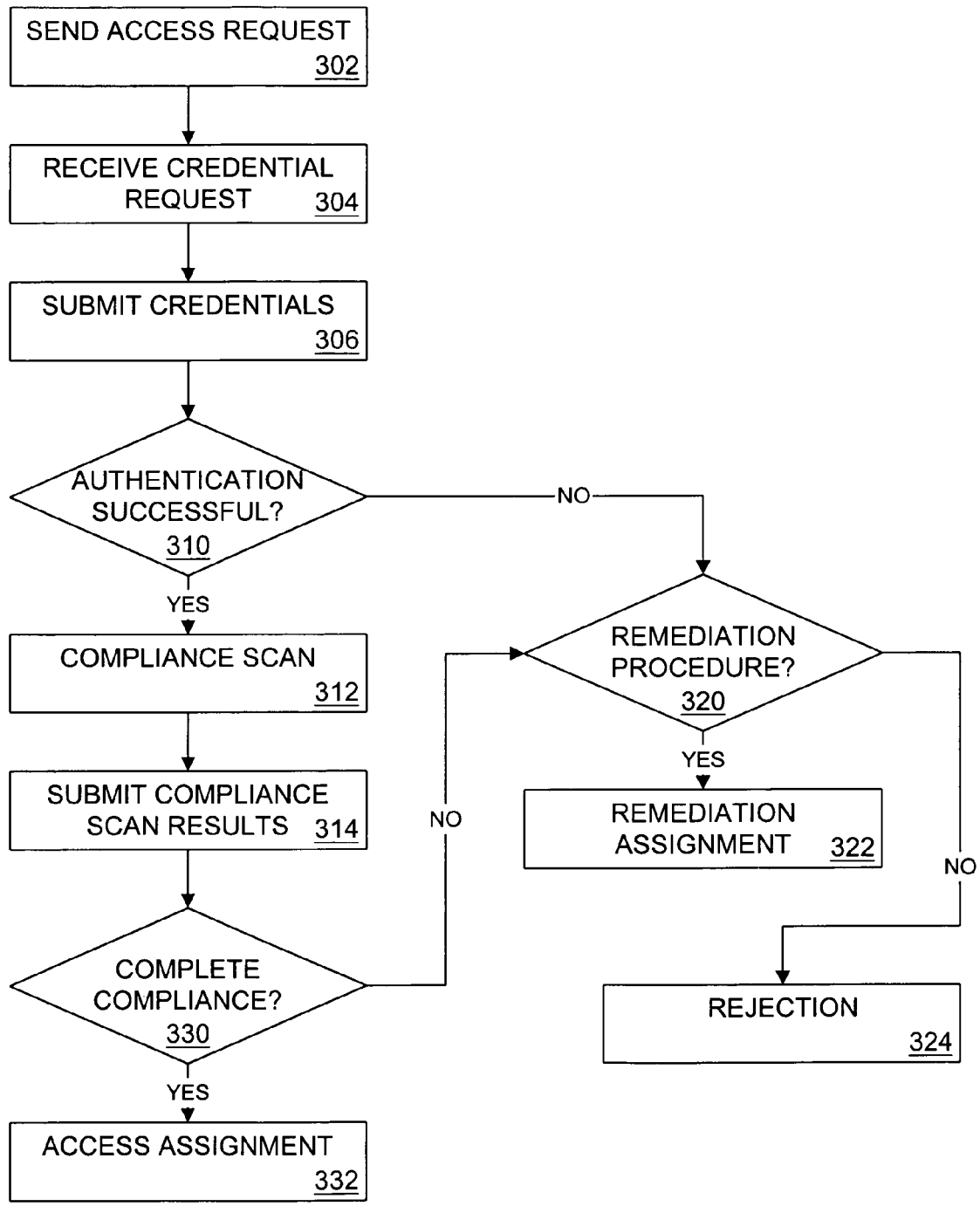
FIG. 3 is a flow diagram of presenting and authenticating a device according to multiple factors in accordance with one embodiment of the invention.

FIG. 3 is a flow diagram of presenting and authenticating a device according to multiple factors in accordance with one embodiment of the invention. A device sends an access request, 302. For example, a device may request an IP address, a wireless communication channel, etc. In response to the access request, a credential request may be sent by the authenticator, and received at the requesting device, 304. The device may submit credentials in response to the credential request, 306. The credentials may include device attributes, as discussed previously herein.

It is determined if the authentication is successful, 310. In this case, authentication is understood as the process of verifying the credentials, i.e., a device attributes, such as an identifier, a pass-phrase, etc. In another embodiment authentication may be understood as attesting to such credentials, as well as another attestation criterion, for example, another attribute, compliance with a security policy, etc. Authentication may be successful if a value or attribute matches an expected value in a database at an authenticator, as is known in the art.

If the authentication is successful, an authenticator may request additional credentials and/or assurance that the presenting device is secure prior to allowing the device access to a communication resource. Thus, in one embodiment, an authenticator requests a compliance scan, and an agent on the presenting device performs a compliance scan, 312. In another embodiment a compliance scan is initiated at the presenting device.

The compliance scan may consist generally of checking a status of various security measures that are, or should be present on the presenting device. For example, a network policy may require that a device have an updated virus scanning software active on the device prior to being granted access to a network. The compliance scan may include determining the quality of virus protection available on a device, e.g., whether a hardware or software/firmware antivirus mechanism is operational on the device, whether the antivirus mechanism is up-to-date or is an older version, whether the antivirus mechanism protects against other forms of malware besides viruses such as worms, spyware, etc.

In one embodiment the compliance scan determines a number of previous violations of the security policy have been committed by a particular device. Thus, a high-risk device may be determined less secure in a compliance scan because a number of violations exceeds some threshold of permissible violations. In one embodiment an operating system, an antivirus program, an application, etc., may be required by a policy to be updated, or up-to-date prior to a device being considered to be in full compliance with the security policy. Updated is to be understood as referring to having patches, additional modules and/or features, etc., installed, and/or that the OS/software be of a particular version. Thus, if the software version is too old, and/or a newer version is missing a newer module, the software may be found to be in violation of at least a part of the policy.

The compliance scan results are submitted or presented, 314. In the case where the authenticator requests a compliance scan, the results may be presented in response to the request. Alternatively, a compliance scan may be performed and the results presented prior to a request being made. This may or may not include storing the results prior to presenting the results. Stored results could be later obtained and used e.g., for presenting, for logging purposes. In one embodiment the compliance results indicate a level of compliance directly, e.g., by stating a level of compliance. In another embodiment the results have data that may be gathered and/or generated, and presented. The data may then be interpreted at the authenticator to determine a level of compliance.

It is determined whether there is complete compliance, 330. Complete compliance may refer to a high level of compliance with the security policy. Based on the valid compliance scan and the other credentials, an access assignment is determined, 332. Note that even if two devices complete a successful authentication sequence, and are determined to have complete compliance, they may not be assigned the same access. For example, based on another credential, it may be determined that one device, such as that of an administrator, should be granted greater access than another device. The access may be granted to a local area network (LAN), a virtual LAN (VLAN), a wide area network (WAN), a wireless LAN (WLAN), a gateway to a network such as the Internet, etc. A network may be considered to be "internal" if it is within the management of a particular organization, and "external" if it is outside the management/control of the organization and/or relates to access outside of a firewall, etc. Access to networks internal to an organization may be allowed to particular groups/classes of users/devices, and denied to others. Thus, based on an identity determined from device credentials and/or compliance results, a device may be determined to be allowed access to particular LANs, VLANs, and/or have external access, etc.

If compliance is less than complete, and/or if a device attribute is determined to be invalid, a remediation procedure may be invoked, 320. A remediation procedure may include granting a lesser access than may otherwise be granted. For example, suppose a member of an organization boots a computing device, which requests network access. The user may belong to a particular group that would normally have access to a particular LAN as well as having Internet access. If a username and password for the user is authenticated, at least a minimal access may be granted, e.g., Internet access. If the user's device is not fully compliant with a security policy, the device may be restricted, e.g., in this example to Internet access only, and be denied access to a LAN that the user would normally be permitted to access. The device may also be denied access, depending on the organization's policy, and/or if the username and password is invalid. Thus, a remediation assignment may be granted, 322. Alternatively, it may be determined that access should be rejected, 324.

Figure 4:
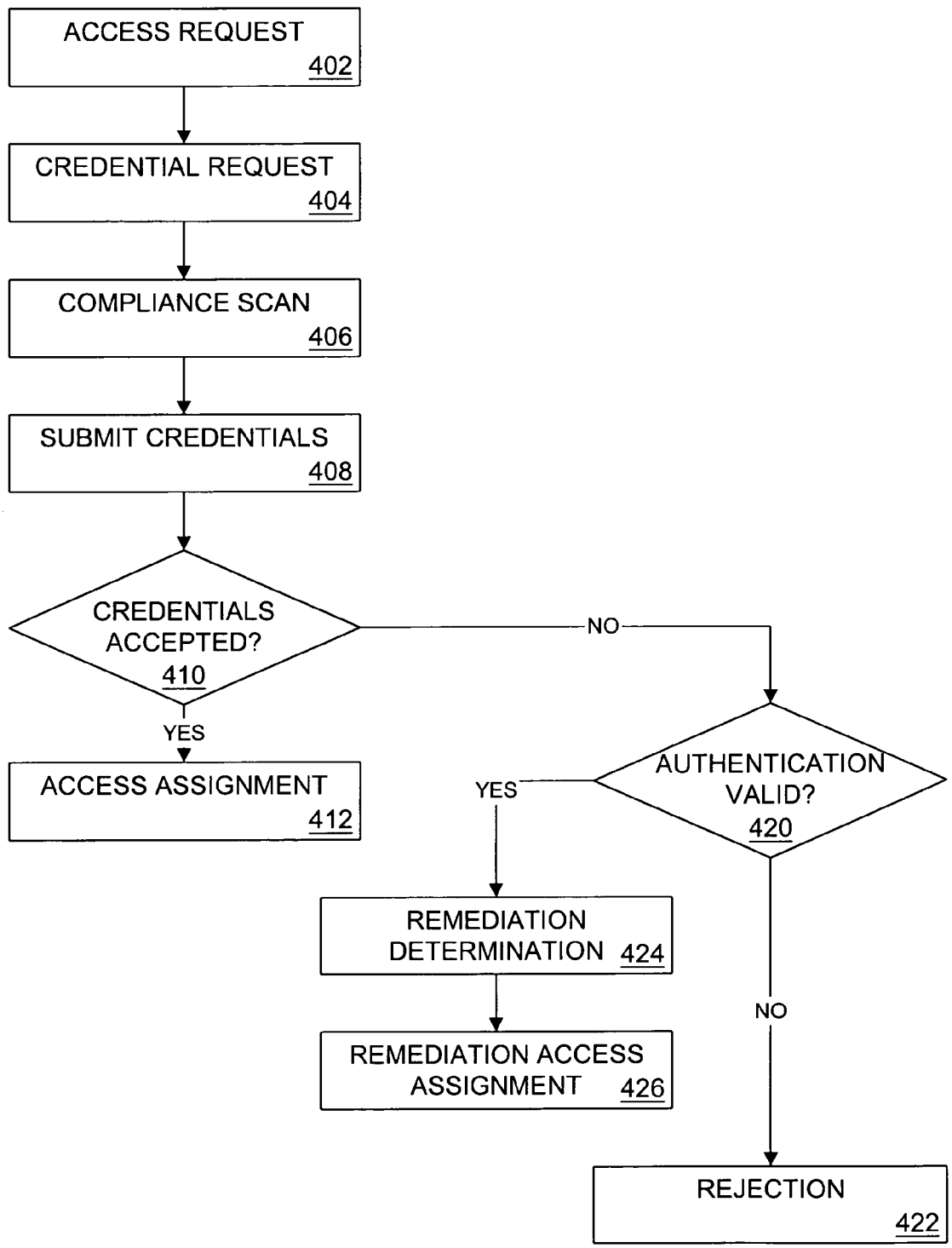
FIG. 4 is a flow diagram of presenting and authenticating a device according to multiple factors in accordance with another embodiment of the invention.

FIG. 4 is a flow diagram of presenting and authenticating a device according to multiple factors in accordance with another embodiment of the invention. Access is requested by a device for access to a network, 402. In response to the access request, a credential request may be made, 404. The credential request may include a request for device attributes. In one embodiment the credential request includes a request for a compliance report. In one embodiment a compliance scan is made in response to the credential request, 406. The compliance scan is to be understood as described herein. Note that the request for credentials may cause a presenting element of a system, e.g., a network interface, to request the compliance scan of a scanning agent. Alternatively, an authenticator may make a direct compliance scan request in conjunction with the request for attributes. Additionally, a credentials request may include a request for a compliance report, which may cause the presenter to invoke a scan.

Note that the compliance scan may have been performed at some instance prior to a request being made, and the results stored. Thus, credentials may be submitted, 408, that include stored results of a compliance scan that was performed previously, or results of a scan that is performed in response to the request. Alternatively, device attributes may be sent without a compliance scan result, and a scanning agent informed of the request. The compliance scanning agent may transmit the results directly to the authenticator over a private link.

If the credentials are accepted, including the compliance scan results, 410, an access assignment may be made, 412, which may include an assignment based on the identity of the device requesting access. If the credentials are not accepted, it may be determined what part of the process caused the credentials to be denied, 420. For example, if a user identifier, e.g., digital certificate, passphrase, is not valid, a complete access rejection may be made, 422.

If the user identifier is valid, and a compliance scan failure caused the credentials to be rejected, a remediation determination may be made, 424. This may include granting limited access to the device, based at least in part on the nature of the compliance violation. Based on the determination, a remediation access assignment may be made, 426.

Figure 5:
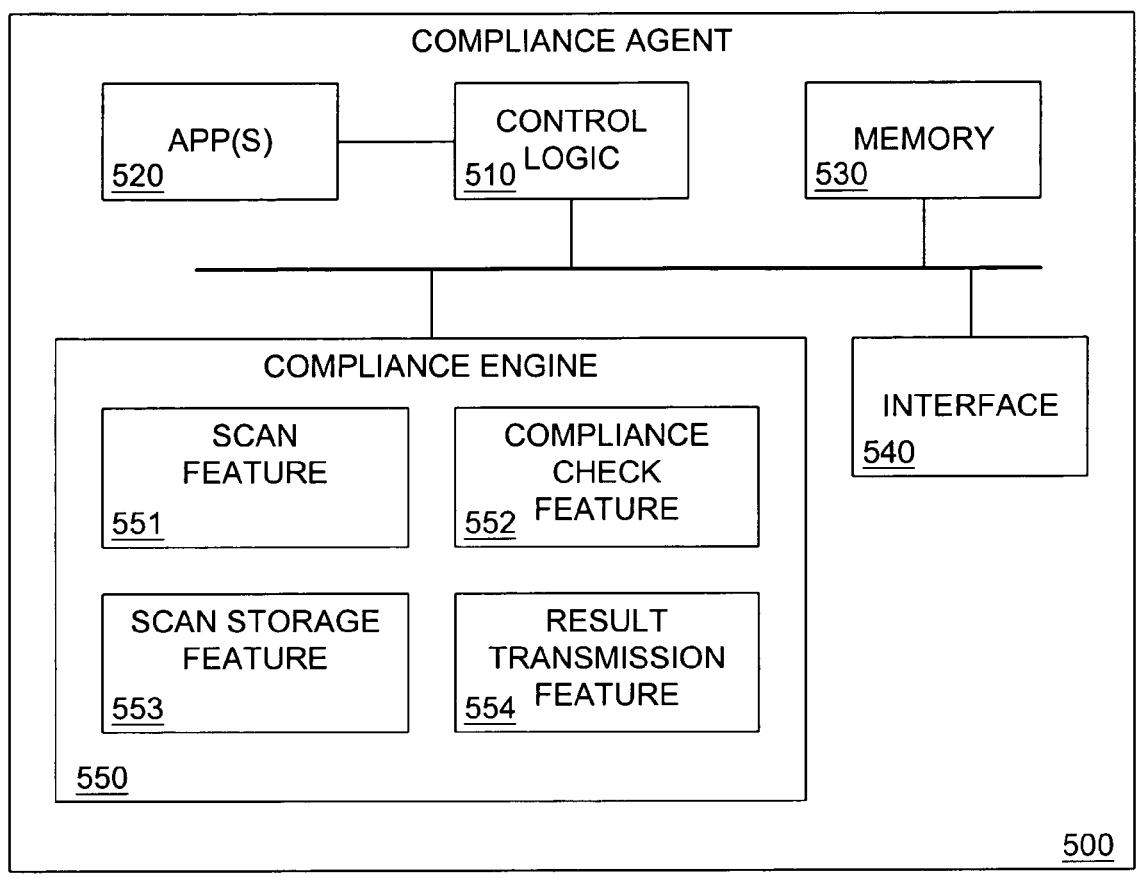
FIG. 5 is a block diagram of a compliance agent in accordance with one embodiment of the invention.

FIG. 5 is a block diagram of a compliance agent in accordance with one embodiment of the invention. Compliance agent 500 represents a circuit, a combination of logic, firmware or group/series of instructions for execution on a computation/logic device, a subsystem, or a virtual subsystem that is configured, enabled, or otherwise able to perform operations related to determining compliance. Control logic 510 directs the flow of operation of agent 500. In one embodiment, control logic 510 is a series of software/firmware instructions to perform logic operations. In another embodiment, control logic 510 can be implemented by hardware control logic, or a combination of hardware-based control logic and software instructions.

Interface 540 provides a communications interface between agent 500 and an external electronic system (not shown). For example, agent 500 as part of a host computing system may have interface 540 to provide a communications interface between agent 500 and the host computing system via a system bus. In one embodiment interface 540 includes a communication path to a network. For example, interface 540 may include an interface to an Ethernet, Internet, wireless communication channel, etc. The communication path may be private to agent 500, shared with other agents, or an access path more widely available to a system of which agent 500 is a part. If the communication path is shared, it could be arbitrated, as is understood in the art.

Agent 500 may include applications 520. Applications 520 represent one or more programs and/or other series of instruction sequences that are executed on control logic 510. In one embodiment agent 500 may execute part of all of a user application or a system application. Applications 520 may provide instructions to control logic 510 to cause agent 500 to perform operations. Instructions may also be provided to control logic 510 by memory 530. For example, control logic 510 may access, or read a portion of memory 530 to obtain instructions to perform a series of operations and/or data for use with operations.

Thus, control logic 510 can receive one or more instructions from internal application software running locally on compliance agent 500, such as applications 520, from memory 530, and/or from external applications, storage media, etc., through interface 540. Agent 500 is not necessarily local to a communication system for which it scans to determine compliance to a policy. For example, interface 540 may provide a communications interface between agent 500 and an electronic system, e.g., over a network, allowing agent 500 to be remote from the system for which it provides scanning services.

Agent 500 includes compliance engine 550. In one embodiment agent 500 may perform operations including reading from a memory, comparing values to expected values, data collection, sending of results, etc., in a system to generate data related to a system's compliance with security measures and/or determine a system's compliance. Compliance engine 550 is shown with various features, which represent functions or features that compliance engine 550 may provide. Each function or feature is provided through performing one or more operations. Compliance engine 550 may include one or more of: scan feature 551, compliance check feature 552, scan storage feature 553, and results transmission feature 554. In one embodiment one or more of these features may exist independently of and/or be external to agent 500. Thus, compliance engine 550 may be more complex or less complex, containing some, all, or additional features to those represented in FIG. 5.

Scan feature 551 enables agent 500 to perform a compliance scan. In one embodiment compliance agent 500 scans a device for compliance to a network access policy in conjunction with requesting access. The scan may include access files, accessing an executing application's settings, monitoring network requests by an application for network access, etc., to determine if an OS and/or an application are operating in compliance with the access policy. Scan feature 551 may generate a report/result to indicate data relating to compliance of the host platform.

Compliance check feature 552 enables agent 500 to check for compliance based on a compliance scan. In one embodiment agent 500 determines from the information gathered/generated during a compliance scan a level of compliance of the system/device agent 500 is scanning. This may include accessing a copy, whether local or remote, of an access policy to determine whether there is compliance. Thus, in one embodiment agent 500 may report a level of compliance if compliance results are transmitted. In another embodiment compliance check feature 552 is not used, and agent 500 may simply transmit the compliance scan data. Compliance scan feature 552 may specifically be considered to be part of an authenticator to which credentials, including compliance scan data, are presented.

Scan storage feature 553 enables agent 500 to store or cause to be stored data and/or a result of a compliance scan. For example, agent 500 may be coupled with a persistent storage, e.g., TPM, flash, etc., in which results could be stored. This allows agent 500 to store a "last-known-good" state and/or scan result. Storing scan results/data enables agent 500 to present results of a previous scan in a situation where authentication may be brought into question, and/or a re-request for access may be made.

Results transmission feature 554 enables agent 500 to send the results of a compliance scan to another entity. The other entity could be considered a policy enforcement point, for example, a device or element on a device on the network to which a presenting device requests access. The entity may be the same device/element that authenticates the requesting device's credentials. Alternatively, a separate element/device may determine compliance or operate in conjunction with the authenticator to ensure enforcement of a network access policy.

In one embodiment agent 500 is implemented with firmware, software, or a combination of firmware and software. Agent 500 may be implemented in hardware and/or a combination of hardware and software and/or firmware. The software and/or firmware content may provide instructions to cause executing hardware to perform various operations, including some or all of the functions/features described above. Instructions to cause a machine/electronic device/hardware to perform the operations may be received via an article of manufacture. An article of manufacture may include a machine accessible medium having content to provide the instructions. A machine accessible medium includes any mechanism that provides (i.e., stores and/or transmits) information in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc.

Reference herein to "embodiment" means that a particular feature, structure, or characteristic described in connection with the described embodiment is included in at least one embodiment of the invention. Thus, the appearance of phrases such as "in one embodiment," or "in alternate an embodiment" may describe various embodiments of the invention, and may not necessarily all refer to the same embodiment. Besides what is described herein, it will be appreciated that various modifications may be made to embodiments of the invention without departing from their scope. Therefore, the illustrations and examples herein should be construed in an illustrative, and not a restrictive sense. The scope of the invention should be measured solely by reference to the claims that follow.

What is claimed is:

1. A method for authentication, comprising:

scanning an electronic system with an agent at the electronic system for compliance with an access security policy to produce a compliance scan result, the result including information identifying an aspect of one or more applications to be executed on the electronic system, the result further indicating a level of compliance of the electronic device with the policy, and a timestamp to indicate a time when the level of compliance was determined, where scanning is performed from a pre-operating system mode of platform operation, prior to loading an operating system;

storing the compliance scan result in a non-volatile storage at the electronic system as a known-good result;

presenting the compliance scan result and an attestation code as a single credential message from the agent at the electronic system to be authenticated to an authenticator for authentication of the electronic system, where the compliance scan result is the stored known-good result, and where the single credential is used to authenticate the electronic system; and receiving an access assignment having an access granted that is based at least in part on validity of the attestation code and the compliance scan result, including basing the access assignment on the timestamp of the compliance scan result, wherein the access assignment is a remediation access assignment if the compliance scan result indicates the electronic system is not in compliance with the policy.

2. A method according to claim 1, wherein scanning for compliance with the security policy comprises determining if virus protection is enabled.

3. A method according to claim 2, wherein determining if virus protection is enabled comprises determining if a software virus scanner is enabled and has an updated virus definition.

4. A method according to claim 2, wherein determining if virus protection is enabled comprises determining if a hardware virus protection is operational.

5. A method according to claim 1, wherein scanning for compliance with the security policy comprises determining if a security monitoring agent is operational on the electronic system.

6. A method for authentication, comprising:
receiving from a remote system to be authenticated an indicator of a level of compliance with security rules based on a compliance scan performed at the remote system, and a system identifier for the remote system corresponding to an access request, the indicator including information identifying an aspect of one or more applications to be executed on the remote system, the indicator received in a single credential message together with the system identifier from an agent at the remote system, the indicator including a timestamp to indicate a time when the level of compliance was determined, where the indicator is a stored known-good result of a compliance scan performed at the remote system from a pre-operating system mode of platform operation, prior to loading an operating system, and where the single credential is used to authenticate the electronic system;
determining a validity of the system identifier;
determining an access assignment for the remote system based at least in part on the indicator and the validity of the system identifier; and
providing the determined access assignment for the remote system, wherein the determined access assignment is a remediation access assignment if the compliance scan result indicates the electronic system is not in compliance with the security rules.

7. A method according to claim 6, wherein receiving the indicator of the level of compliance comprises receiving an indicator of an extent to which the remote system has implemented operating system updates.

8. A method according to claim 6, wherein receiving the indicator of the level of compliance comprises receiving an indicator of a type of host applications are executing on the remote system.

9. A method according to claim 6, wherein receiving the system identifier comprises receiving a digital certificate for the remote system.

10. A method according to claim 6, wherein providing the access assignment based on the validity of the system identifier further comprises comparing the system identifier to one or more values in a database.

11. A method according to claim 6, wherein providing the access assignment based on the system identifier comprises providing a limited access to the remote system if the system identifier is not valid.

12. A method according to claim 6, wherein providing the access assignment based on the indicator comprises providing full access to the remote system if the indicator indicates full observance of the security rules.

13. A method according to claim 6, wherein providing the access assignment based on the indicator comprises providing reduced access to the remote system if the indicator indicates less than full observance of the security rules.

14. An article of manufacture comprising a tangible machine accessible medium having content stored thereon to provide instructions to cause a machine to perform operations including:
scanning an electronic system with an agent at the electronic system for compliance with an access security policy to produce a compliance scan result, the result including information identifying an aspect of one or more applications to be executed on the electronic system, the result further indicating a level of compliance of the electronic device with the policy, and a timestamp to indicate a time when the level of compliance was determined, where scanning is performed from a pre-operating system mode of platform operation prior to loading an operating system;
storing the compliance scan result in a non-volatile storage at the electronic system as a known-good result;
presenting the compliance scan result and an attestation code as a single credential message from the agent at the electronic system to be authenticated to an authenticator for authentication of the electronic system, where the compliance scan result is the stored known-good result, and where the single credential is used to authenticate the electronic system; and
receiving an access assignment having an access granted that is based at least in part on validity of the attestation code and the compliance scan result, including basing the access assignment on the timestamp of the compliance scan result, wherein the access assignment is a remediation access assignment if the compliance scan result indicates the electronic system is not in compliance with the policy.

15. An article of manufacture according to claim 14, wherein the content to provide instructions to cause the machine to perform operations including scanning for compliance with the security policy comprises the content to provide instructions to cause the machine to perform operations including determining if virus protection is enabled.

16. An article of manufacture according to claim 14, wherein the content to provide instructions to cause the machine to perform operations including scanning for compliance with the security policy comprises the content to provide instructions to cause the machine to perform operations including determining if a security monitoring agent is operational on the electronic system.

17. An article of manufacture comprising a tangible machine accessible medium having content stored thereon to provide instructions to cause a machine to perform operations including:
receiving from a remote system to be authenticated an indicator of a level of compliance with security rules based on a compliance scan performed at the remote system, and a system identifier for the remote system corresponding to an access request, the indicator including information identifying an aspect of one or more applications to be executed on the remote system, the indicator received in a single credential message together with the system identifier from an agent of the remote system, the indicator including a timestamp to indicate a time when the level of compliance was determined, where the indicator is a stored known-good result of a compliance scan performed at the remote system from a pre-operating system mode of platform operation, prior to loading an operating system, and where the single credential is used to authenticate the electronic system;
determining a validity of the system identifier;
determining an access assignment for the remote system based at least in part on the indicator and the validity of the system identifier; and
providing the determined access assignment for the remote system, wherein the determined access assignment is a remediation access assignment if the compliance scan result indicates the electronic system is not in compliance with the policy.

18. An article of manufacture according to claim 17, wherein the content to provide instructions to cause the machine to perform operations including receiving the indicator of the level of compliance comprises the content to provide instructions to cause the machine to perform operations including receiving an indicator of an extent to which the remote system has implemented operating system updates.

19. An article of manufacture according to claim 17, wherein the content to provide instructions to cause the machine to perform operations including receiving the indicator of the level of compliance comprises the content to provide instructions to cause the machine to perform operations including receiving an indicator of a type of host applications are executing on the remote system.

20. An article of manufacture according to claim 17, wherein the content to provide instructions to cause the machine to perform operations including receiving the system identifier comprises the content to provide instructions to cause the machine to perform operations including receiving a digital certificate for the remote system.

21. An article of manufacture according to claim 17, wherein the content to provide instructions to cause the machine to perform operations including providing the access assignment based on the indicator comprises the content to provide instructions to cause the machine to perform operations including providing reduced access to the remote system if the indicator indicates less than full observance of the security rules.

* * * * *